TAP CHANGING VARIABLE INDUCTOR

Filed Nov. 22, 1949 2 Sheets-Sheet 1

EDWIN P. THIAS
INVENTOR.
HUEBNER, BEEHLER, WORREL,
HERZIG and CALDWELL.
BY Conrad C. Caldwell
ATTORNEYS.

June 29, 1954 E. P. THIAS 2,682,643

TAP CHANGING VARIABLE INDUCTOR

Filed Nov. 22, 1949 2 Sheets-Sheet 2

EDWIN P. THIAS
INVENTOR.

HUEBNER, BEEHLER, WORREL,
HERZIG and CALDWELL
BY Conrad A. Caldwell
ATTORNEYS.

Patented June 29, 1954 2,682,643

UNITED STATES PATENT OFFICE 2,682,643

TAP CHANGING VARIABLE INDUCTOR

Edwin P. Thias, Los Angeles, Calif., assignor to Standard Coil Products Co., Inc., Chicago, Ill., a corporation of Illinois Application November 22, 1949, Serial No. 128,708

4 Claims. (Cl. 336—79)

My invention relates to a means for tuning the frequency response of an electrical circuit which contains an inductance and a capacity which varies the impedance of a given circuit in steps with a fine tuning adjustment within the frequency band selected by each step.

Whereas, the broad principle hereinafter disclosed and described is applicable to any circuit wherein it is desired to change the frequency response or inductance of a given circuit in steps with a fine adjustment at each step, my invention finds one of its most useful applications in connection with high frequency radio broadcasting and receiving such as television.

Tuning of inductance circuits in high frequency applications is well-known and has heretofore sometimes taken the form of tuners having a pair of parallel conductors with a shorting bar slidably disposed to vary the path of the current. It is well-known that the length of the path of the current determines the inductance or impedance of a circuit for high frequency currents.

Tuning means for varying inductance of a circuit such as above described which are known in the art are to some degree satisfactory for those ranges of frequencies wherein it is desired to employ the entire spectrum but are unsatisfactory where the spectrum becomes relatively broad and there are bands within the spectrum over which no broadcasts are transmitted. A more satisfactory tuning means would be one which is capable of skipping the unused bands so that the inductance path need not be unnecessarily long.

It is one of the objects of my invention to provide a means for varying the inductance of a radio circuit wherein the unused bands of the spectrum are skipped but that portion of the band which is used may be tuned with a fine adjustment.

It is known to the art that the positioning of a conductive plate in close proximity to a conductor having an inductance decreases the inductance of the circuit.

It is a further object of my invention to produce a tuner having a sliding contact such as a shorting bar to preselect inductance ranges and to provide means for obtaining a fine adjustment of the inductance step which comprises a slight change in the conductor length and a tuning vane which cooperates therewith to increase the fine tuning range. Such tuning vane may take the form of a conductive plate in close proximity to the selected conductor in order to vary the inductance of the conductor by movement of the conductive plate.

It is a further object of my invention to produce a simplified, relatively inexpensive, tuneable circuit which can be readily ganged into multiple tuning circuits for controlling two or more impedance circuits at one time.

With these and other objects in view, the invention consists in the construction, arrangement and combination of the various parts of the device whereby the objects contemplated are attained, as hereinafter set forth, pointed out in the appended claims, and illustrated in the accompanying drawings.

Figure 6:
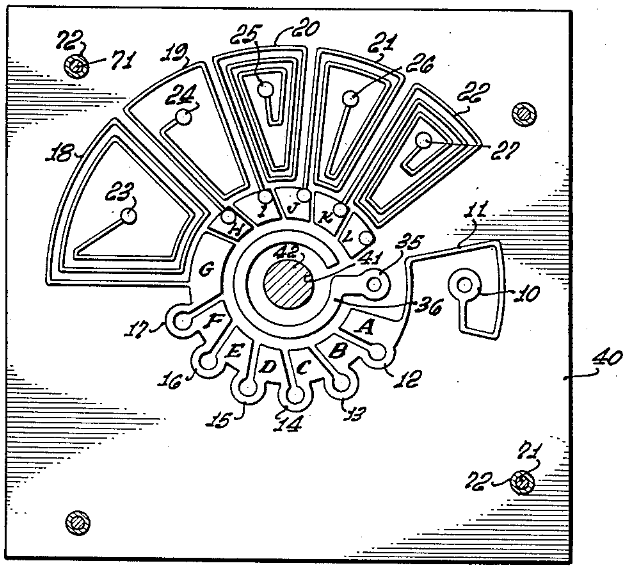
Figure 6 is a sectional view taken on line 6—6 of Figure 2.
Figure 7:
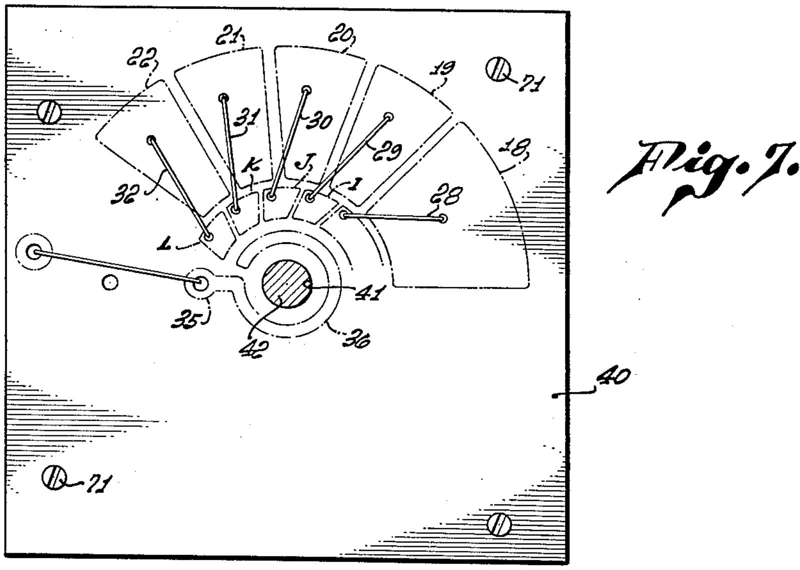
Figure 7 is a view taken on line 7—7 of Figure 2.

Referring specifically to Figure 6, I have illustrated a circuit comprising a connecting terminal 10 having a conductor 11 electrically connected thereto, which said conductor is connected to a switch terminal A. The circuit illustrated is a plurality of such switch terminals A to L, inclusive. The switching terminals are interconnected by inductance loops 12 to 22, inclusive.

Each of the inductance loops 18 to 22, inclusive, are provided with terminal contacts 23 to 27, inclusive. The terminal contacts 23 to 27, inclusive, are electrically connected to switching terminals H to L, inclusive, by conductors 28 to 32, inclusive, thereby forming a continuous electrical path from switch terminal A to switch terminal L.

The circuit also embodies a terminal contact 35 connected to a conductor 36 formed in an arcuate path.

The switching contacts A to L, inclusive, the terminal contacts 10 and 35, the conductor and the inductance loops 12 to 22, inclusive, are all secured to a mounting plate 40 formed of a suitable dielectric material by a process hereinafter to be described.

The means for completing the circuit between the conductor 36 and the other interconnected elements is more clearly shown in Figures 1 to 5, inclusive. The dielectric plate 40 is formed with an aperture 41 formed concentric with the inductance circuit heretofore described and rotatably receives a shaft 42. A dielectric hub member 43 is non-rotatably secured to the shaft 42 by means of a set screw 44.

The dielectric hub member 43 is formed with an axial boss 45 adapted to frictionally engage the plate 40 to space the tuning means therefrom.

The hub member 43 is formed with one edge, such as 46, higher than the edge 47, and a resilient plate 48 secured thereto by means of a rivet or screw 49. In view of the fact that the resilient plate 48 is secured to the hub member 43 at the high point, it does not contact the hub member at the low point 47 thereby allowing for a resilient adjustment of any variation in manufacturing.

Figure 4:
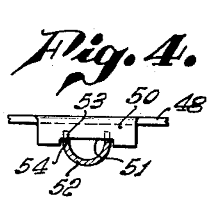
Figure 4 is an enlarged sectional detail taken on line 4—4 of Figure 3.
Figure 5:
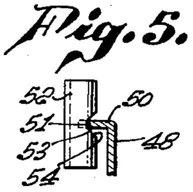
Figure 5 is an enlarged sectional detail taken on line 5—5 of Figure 3.

As will be seen more clearly in Figures 4 and 5, the resilient plate 48 is formed with a downwardly turned lip 50 having an undercut section 51. A semi-cylindrical shorting member 52 is disposed in the undercut section 51 and secured against longitudinal or lateral movement by means of a V-shaped notch 53 and shoulders 54 defined by the undercut section 51. The shorting member 52 is free to rock with respect to the lip 50, the purpose for which will become apparent upon further explanation of my invention.

Figure 2:
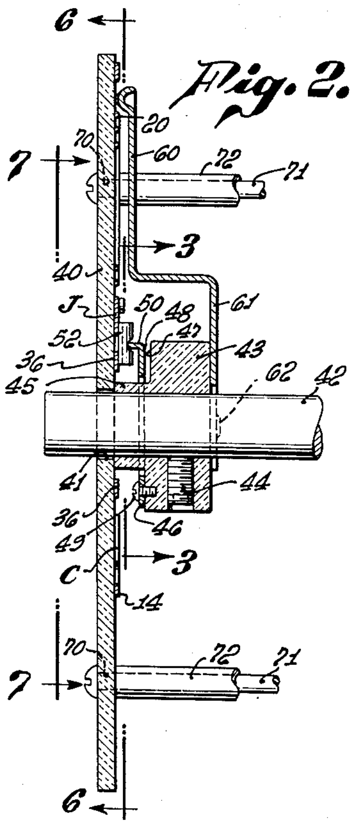
Figure 2 is a sectional view taken on line 2—2 of Figure 1.
Figure 3:
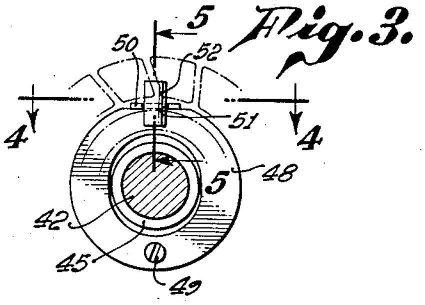
Figure 3 is a sectional view taken on line 3—3 of Figure 2.

The shorting member 52 is adapted to electrically connect the conductor 36 with one of the switching terminals A to L, inclusive (in Figure 2 switch contact J).

A tuning vane having a conductive plate 60 is secured to the hub member 43 by means of a mounting plate 61 and rivets 62. The tuning vane is thereby secured in fixed relation with respect to the shorting member 52 and rotates therewith upon rotation of the shaft 42.

Figure 1:
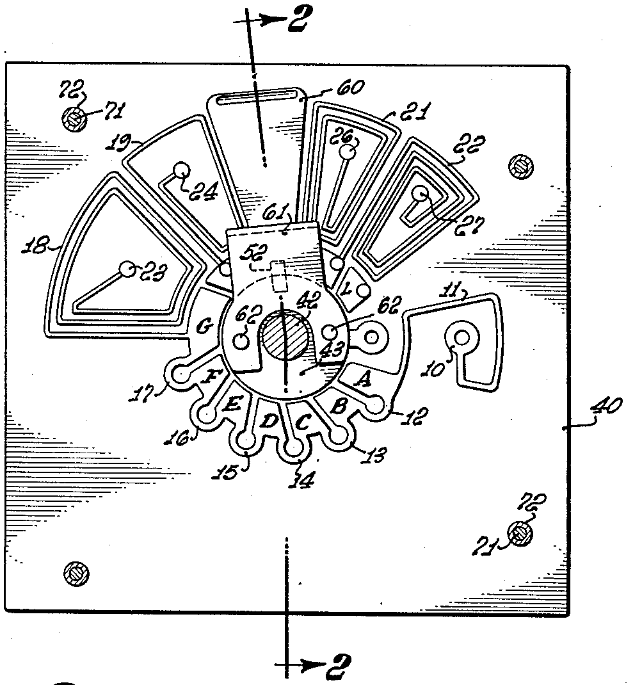
Figure 1 is a plan view of an inductance varying means embodying the principles of my invention.

It will be noted in Figures 1 and 6 that the gap between the switching contacts such as A and B is illustrated as being not radial which is the preferred form in some applications. The purpose for such construction is as follows: The shorting member 52 being semi-cylindrical presents substantially a line contact between the conductor 36 and the various switching contacts and is radially disposed with respect to the center of rotation. By making the gap between the switching contacts non-radial, a complete electrical circuit exists at all times and is not interrupted. If the gaps were radial there would be an interruption of the circuit, even though momentary, between the various switching terminals. Such interruption might result in arcing and the eventual building of a carbon pile between the switching contacts to thereby short them. It is apparent that the use of radial gaps with a non-radially disposed shorting member would perform the same function and should be considered as the equivalent.

As illustrated in Figure 1, the shorting member 52 interconnects the conductor 36 with the switching terminal J so that an electrical circuit is completed between the terminals 10 and 35 through the path, conductor 11, inductance loops 12 to 20, inclusive, conductor 30, switching contact J, shorting member 52 and conductor 36. By preselecting the length of the loops 12 to 20, inclusive, and selecting the configuration of the coils 18 to 20, inclusive, the circuit will have a predetermined inductance upon the connection to the contact J, and thus will be responsive to a predetermined frequency in a given circuit.

It will be noted that the switching contact J is arcuately relatively wide and that the tuning vane 60 can move over a relatively wide space with respect to the coil 20 while said coil is still connected. By the movement of the vane 60 the inductance of the coil or loop 20 can be varied.

In the manufacturing of the circuit and the securing of the same to the plate 40, I employ a method which is relatively inexpensive and which results in a substantially identical reproduction of the circuit for mass production purposes.

After determining the exact length of each portion of the circuit by previous calculation, the circuit is drawn on paper, a photograph taken thereof, which said photograph is reproduced on a metal clad dielectric plate having a light sensitized emulsion surface. After the circuit picture has been developed, the undesired portions of the metal surface may be dissolved and etched by any well-known process and only the desired conductive path remains on the plate 40, which said paths can be built up by electro-deposition of copper, silver or other conductive material, if desired.

The plate 40 may be formed with a plurality of apertures such as 70 which are adapted to receive studs 71 which have spacing sleeves 72 disposed thereover. In such manner it becomes readily apparent that multiplicity of circuits can be ganged so that any number of tunable circuits can be controlled by the shaft 42. The inductance means illustrated may, however, be ganged by any desired method.

While I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices.

I claim:

1. In a frequency tunable unit, a variable inductor comprising a dielectric plate; said dielectric plate having metallic surfaces thereon defining conductive paths; one of said paths comprising a plurality of inductive reactances and spaced switching contacts; another of said paths being essentially circular in shape; a shaft concentric with said second-mentioned path; rotatable contact means being attached to said shaft adapted to successively engage said switching contacts simultaneously with said second-mentioned path; said movable contact means being rigid and being resiliently held against said conductive paths; said spaces between said switching contacts being directed away from said shaft at an angle from the radial directions so that a complete electrical circuit exists throughout the rotation of said rotatable contact means; and a fine tuning conductive plate secured in fixed relation to said movable contact means, said fine tuning conductive plate being maintained in predetermined spaced relation to said dielectric plate, positioning and spacing means at each end of said conductive plate for establishing the said predetermined spaced relation between the said conductive plate and the said dielectric plate.

2. In a frequency tunable unit, a variable inductor comprising a dielectric plate; said dielectric plate having metallic surfaces thereon defining conductive paths; one of said paths comprising a plurality of inductive reactances and spaced switching contacts; another of said paths being essentially circular in shape; and a rotatable unit, said rotatable unit comprising a shaft concentric with said second-mentioned circular path; a hub attached to said shaft; a resiliently held rigid contactor attached to said hub and adapted to successively engage said switching contacts simultaneously with said second-mentioned circular path; and a conductive plate rigidly attached at one end to said hub and sliding on said dielectric plate at the other end, said fine tuning conductive plate being maintained in predetermined spaced relation to said dielectric plate, positioning and spacing means at each end of said conductive plate for establishing the said predetermined spaced relation between the said conductive plate and the said dielectric plate.

3. In a frequency tunable unit, a variable inductor comprising a dielectric plate; said dielectric plate having metallic surfaces thereon defining conductive paths; one of said paths comprising a plurality of inductive reactances and spaced switching contacts; another of said paths being essentially circular in shape; a shaft concentric with said second-mentioned path; rotatable contact means being attached to said shaft adapted to successively engage said switching contacts simultaneously with said second-mentioned path; said movable contact means being rigid and being resiliently held against said conductive path; said spaces between said switching contacts being directed away from said shaft at an angle from the radial directions so that a complete electrical circuit exists throughout the rotation of said rotatable contact means; and a fine tuning conductive plate secured in fixed relation to said movable contact means, said fine tuning conductive plate being maintained in predetermined spaced relation to said dielectric plate, positioning and spacing means at each end of said conductive plate for establishing the said predetermined spaced relation between the said conductive plate and the said dielectric plate, said positioning and spacing means comprising a boss at the outer margin of said fine tuning conductive plate bearing against said dielectric plate.

4. In a frequency tunable unit, a variable inductor comprising a dielectric plate; said dielectric plate having metallic surfaces thereon defining conductive paths; one of said paths comprising a plurality of inductive reactances and spaced switching contacts; another of said paths being essentially circular in shape; a shaft concentric with said second-mentioned path; rotatable contact means being attached to said shaft adapted to successively engage said switching contacts simultaneously with said second-mentioned path; said movable contact means being rigid and being resiliently held against said conductive path; said spaces between said switching contacts being directed away from said shaft at an angle from the radial directions so that a complete electrical circuit exists throughout the rotation of said rotatable contact means; and a fine tuning conductive plate secured in fixed relation to said movable contact means, said fine tuning conductive plate being maintained in predetermined spaced relation to said dielectric plate, positioning and spacing means at each end of said conductive plate for establishing the said predetermined spaced relation between the said conductive plate and the said dielectric plate, said positioning and spacing means comprising a boss at the outer margin of said fine tuning conductive plate bearing against said dielectric plate, and a bushing on said shaft between the said dielectric plate and an extension of the said fine tuning conductive plate.

References Cited in the file of this patent

UNITED STATES PATENTS

| Number | Name | Date |
|---|---|---|
| 1,679,459 | Willans et al. | Aug. 7, 1928 |
| 2,513,392 | Aust | July 4, 1950 |

FOREIGN PATENTS

| Number | Country | Date |
|---|---|---|
| 215,121 | Great Britain | May 8, 1924 |
| 615,106 | Great Britain | Jan. 3, 1949 |